United States Patent

Gordon et al.

[11] Patent Number: 5,152,438
[45] Date of Patent: Oct. 6, 1992

[54] POUR SPOUT CONSTRUCTION

[75] Inventors: Robert L. Gordon, Monroe; Roderick W. Kalberer, Salisbury Mills, both of N.Y.

[73] Assignee: International Paper Company

[21] Appl. No.: 551,818

[22] Filed: Jul. 12, 1990

[51] Int. Cl.$^5$ .................... B65D 47/00; B65D 5/74
[52] U.S. Cl. .................... 222/546; 222/551; 222/562; 156/69; 156/73.1; 156/580.2; 156/581; 215/232; 229/125.04; 229/125.14; 229/125.33
[58] Field of Search .............. 222/83.5, 88, 90, 540, 222/551, 566, 546, 562; 229/125.01, 125.04, 125.09, 125.14, 125.15, 125.33; 220/288, 359, 465; 215/232; 264/69; 493/214, 215; 156/69, 73.1, 308.2, 580.1, 580.2, 581

[56] References Cited

U.S. PATENT DOCUMENTS

| | | |
|---|---|---|
| 2,400,716 | 5/1946 | Sattler . |
| 3,047,942 | 8/1962 | Schneider et al. . |
| 3,169,690 | 2/1965 | Scholle . |
| 3,947,307 | 3/1976 | Buchscheidt . |
| 4,165,023 | 8/1979 | Schmit .................... 222/105 |
| 4,266,993 | 5/1981 | Olsen . |
| 4,378,069 | 3/1983 | Franco .................... 222/92 X |
| 4,411,720 | 10/1983 | Sager . |
| 4,483,464 | 11/1984 | Nomura .................... 222/83 |
| 4,605,136 | 8/1986 | Debetencourt . |
| 4,711,380 | 12/1987 | Ulm .................... 222/541 |
| 4,795,061 | 1/1989 | Bedwell et al. . |
| 4,801,371 | 1/1989 | Hayasguda et al. . |
| 4,813,578 | 3/1989 | Gordon et al. . |
| 4,830,273 | 5/1989 | Kalberer et al. . |
| 4,909,434 | 3/1990 | Jones et al. . |
| 4,948,015 | 8/1990 | Kawajiri et al. .................... 222/83 X |

Primary Examiner—Michael S. Huppert
Assistant Examiner—Kenneth DeRosa

[57] ABSTRACT

A pour spout carton for extended shelf life paperboard containers, such as those of the gable top type. A first barrier layer lines the carton interior and a second lines the carton exterior surface. A dispensing opening is formed, as by die cutting, in a panel of the carton. The two barrier layers span the dispensing opening, except for a concentric dispensing hole through them, with the two barrier layers sonically sealed together along an annular zone radially intermediate the dispensing opening and the dispensing hole. The pour spout carries a flange extending from the edge of the dispensing hole to a location radially beyond the dispensing opening, the flange sonically bonded to the outer barrier layer at three radially spaced, concentric zones. The spout screw cap is of a different polymer than the spout, to prevent bonding between the cap and spout. Use of the specific sonic horn configuration and spout dimensions of this invention yields pour spout attachment times of about one half of prior spout attachment methods and spout constructions.

4 Claims, 2 Drawing Sheets

POUR SPOUT CONSTRUCTION

BACKGROUND OF THE INVENTION

This invention relates to the packaging of liquid or powder products, such as fruit juices, milk, sugar, salt, soap powders and the like and more particularly to a carton construction which provides both the required protective barrier sealing of the product while at the same time permitting ease of initial opening of the container for dispensing of the contents.

In the field of protective barrier packaging, it is essential that the interior surfaces of the container be completely covered or laminated with one or more barrier layer materials. This layer may be formed from metal foil for example, or alternatively, it may be defined by a laminate of several layers, with each layer being of a different composition, such as polyethylene, Surlyn, metallic foil, etc. Additionally, it is desirable that when the initial dispensing operation is to take place, thereby necessitating a breaking or a rupture of the barrier layer, that such rupturing takes place with a minimum of inconvenience to the consumer. Exemplary of the efforts of others to provide a pour spout construction which will result in the rupture of a dispensing opening seal upon initial use of the package are shown in U.S. Pat. No. 4,399,924 issued to Nilsson and U.S. Pat. No. 4,483,464 issued to Nomura. Other examples of combination liquid pour spouts and seals are illustrated in U.S. Pat. Nos. 4,469,249 and 4,600,127, both issued to Malpas et al.

Aside from the required barrier layer for packaging certain product types, such as potables, known methods and apparatus for fixing a pour spout to a paperboard container or blank, such as a gable top container or blank therefor, without an internal barrier layer, yield only relatively modest fixing rates.

SUMMARY OF THE INVENTION

This invention permits relatively high rates of fixing pour spouts to gable top type paperboard containers. A specific design of the pour spout and screw cap configuration, and a specified sonic horn configuration, yield pour spout fixing rates about double that achieved with present methods and apparatus. Instead of a flat sonic head sealer contacting the pour spout flange during fixing to the carton or carton blank, the sonic head is provided with three concentric ridges which serve to rapidly and efficiently heat bond the spout flange to the usual polyethylene coating or to a specific barrier layer on the carton exterior.

In those instances where extended shelf life of the packaged product is desired the invention permits, with only a slight apparatus addition, sealing of the raw edge of the carton dispensing opening.

DETAILED DESCRIPTION OF THE INVENTION

Figure 1:
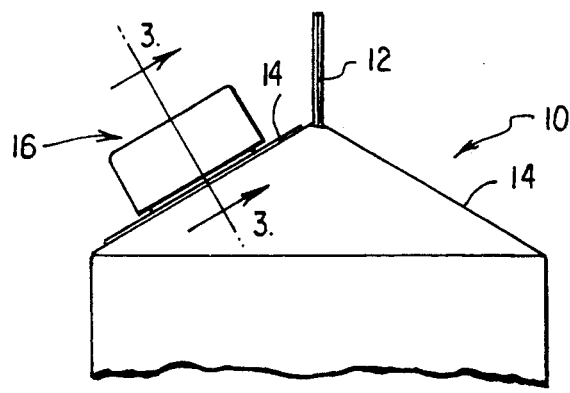
FIG. 1 is a partial end elevational view of a typical gable top container provided with the pour spout construction of this invention.

Referring now to FIG. 1, the upper portion of an otherwise conventional gable top container 10 having the usual upper fin 12 and slanting gable walls 14 is illustrated. A pour spout fitment is denoted generally as 16. The container partially illustrated at FIG. 1 is entirely similar to that shown at FIG. 1 of U.S. Pat. No. 4,813,578 issued to Robert L. Gordon et al.

Figure 2:
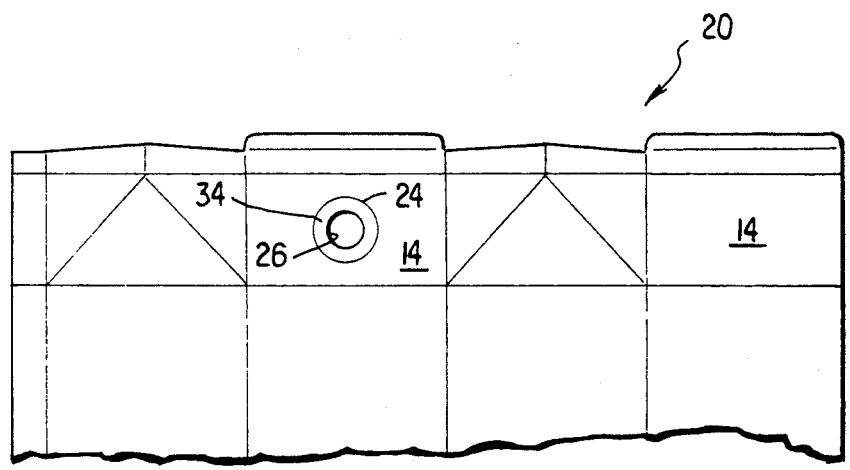
FIG. 2 is a plan view of the upper portion of a typical paperboard blank from which the gable top container of FIG. 1 is fashioned.

FIG. 2 illustrates the upper portion 20 of a conventional paperboard blank for forming a gable top carton. One of the gable forming panels 14 of the blank is provided with a dispensing opening 24 which also may be provided with an opening 26 in a laminated barrier layer as will later be described.

Figure 3:
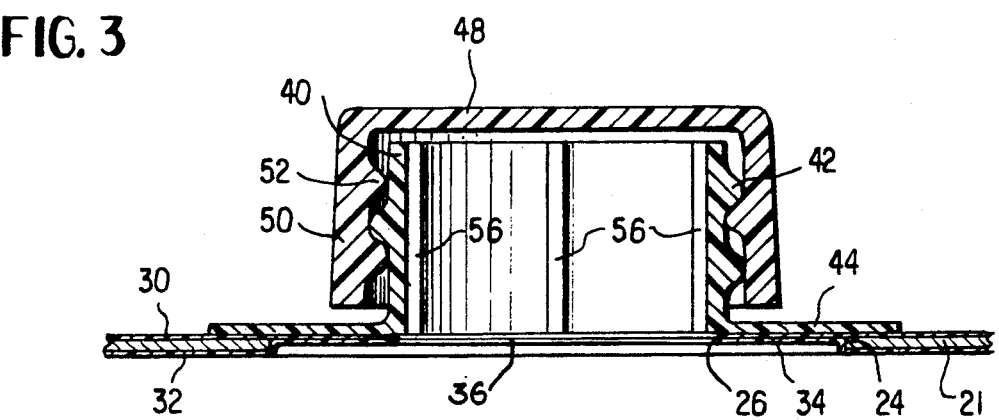
FIG. 3 is a view taken in the direction of 3—3 of FIG. 1 and illustrates the pour spout construction of this invention.

FIG. 3 illustrates the construction of the pour spout and gable top container of this invention. The paperboard from which blank 20 is fashioned is denoted as 21. The usual polyethylene layer or coating on the exterior of the blank is designated as 30, with an internal barrier layer covering the entire surface of one side of the blank, and hence of the completed carton, designated as 32. External polyethylene layer 30 and internal barrier layer 32 extend radially inwardly from the edge of dispensing opening 24 to form a laminate 34. A central opening in laminate 34 is denoted as 36. This opening is termed a pour opening and its edge is denoted as 26. The pour spout is denoted by 40 and includes a short cylindrical section provided on its exterior with threads 42. The lower portion of the spout carries a flange 44. The spout is fashioned of a plastic material. The pour spout cap includes a upper disk portion 48 having an annular skirt 50 and internal threads 52 on the skirt. Threads 52 and 42 are adapted to become engaged and effect full closure with only one turn of the closure cap.

The height of the cap is less than the height of the spout. This is done to insure that when the cap is screwed down it does not bottom out or touch the base (flange) of the spout. If it touched the spout base, a resealable seal would not occur, causing leakage. This difference in height is in the range of 0.01 inches. The material of the cap is a critical factor. It has to be of a polymer dissimilar to the spout. Upon sonic sealing of the spout flange to the container blank 20 (to be described) the vibration induced heat generated would fuse the spout and cap together if they were of similar materials. The cap material used is polypropylene while the spout material is low density or linear low density polyethylene.

The spout material is LDPE or LLDPE which serves two very important functions. First is the nonfusing relationship to the cap. Secondly, and most important, is the compatibility of this material to the outer surface of the container which is LDPE. When sonic (vibration creating heat) power is applied to the top surface of the flange, the flange material flows creating a permanent bond between the spout and carton surface. The flange sealing area from the outside of the cap to the outer diameter is critical. This dimension allows enough room for the sealing. After testing it was determined that if it were thinner, holes or stress points would be created. If it were thicker it would require more power and longer dwell time to seal the flange. The 0.020" permits the sealing of the fitment to the container at form fill seal rates of 90/min. Known methods and apparatus can only seal at one half this rate. The combined cap and spout are circular in shape. This shape allows the fitment to roll on conveying equipment. Thus, there is no concern about alignment or orientation. The top of the spout has a flat uninterrupted surface that acts as a pour lip and a platform to seal the tamper evident membrane. This surface is 0.085" wide which allows for an adequate sealing. On the interior of the spout wall are four vertical ribs. These ribs are used in the molding process to grasp the spout while unscrewing them from the mold.

A conventional foil/foam tamper evident seal can be adhered to the top surface of the pour spout. The material is die cut from a web and conduction sealed to the spout. When the cap is screwed down internal pressure is applied to the membrane insuring a protected leak-proof seal. The linear low density polyethylene spout material is compatible with the membrane sealing surface which yields a peelable bond.

Figure 4:
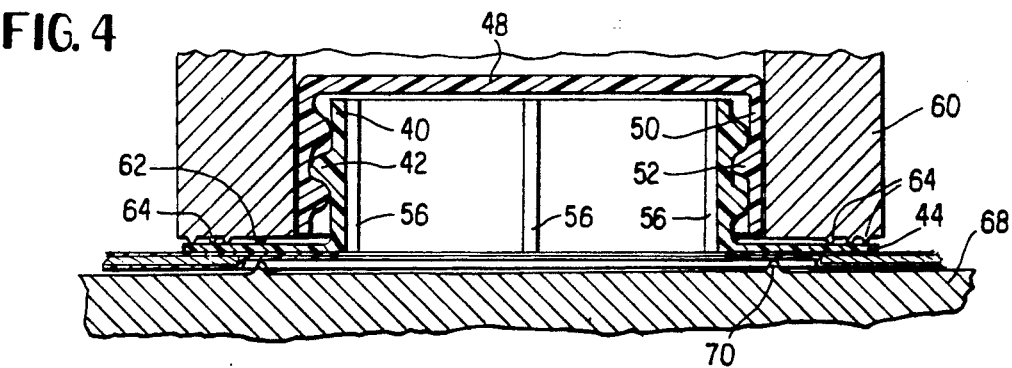
FIG. 4 is a view similar to FIG. 3 and illustrates the method of assembly of the pour spout of this invention in conjunction with an ultrasonic horn and a backup mandrel.

FIG. 4 illustrates the method of assembling the element shown at FIG. 3. An annular ultrasonic horn, the flange and cap pour fitment assembly, the paperboard blank 20 with barrier layers, and a backup mandrel are assembled as indicated. The ultrasonic horn 60, has a flat annular end surface 62 modified by this invention so as to include a plurality of concentric ridges 64. Ridges 64 rest on flange 44, radially outside of opening 24 in paperboard blank 20. Backup mandrel 68 is provided with a single circular ridge 70 radially interiorly positioned with respect to the rim of opening 24 of paperboard blank 20. It is seen that the laminate 34 is pinched between ridge 70 and flat surface 62 of horn 60. Application of sonic energy is transmitted by ridges 64 to flange 44, the ridges focussing the energy. Without these ridges, the energy would be distributed over a wider area thus slowing down the sealing time and causing an increase in power input. The ridge height and spacing are critical in obtaining a consistent seal. If the ridges are too close, the energy density would be too great causing burning of the seal. If they are too far apart, effective sealing would not occur. A stop is provided to prevent the sealing ridges 64 from penetrating too far into the spout flange 44.

Ridge 70 bears against interior barrier layer 32 of laminate 34, upper layer 30 is pressed by flange 44, the latter pressed by flat surface 62 of horn 60. Upon application of sonic energy, layers 30 and 32 of laminate 34 are sealed together and laminate 34 is sealed to the bottom of flange 44. Sealing of the laminate 34 (layers 30 and 32) protects the container contents from the raw paperboard edge of hole 24.

If the raw edge protection afforded by laminate 34 is not required for a specific packaging application, ridge 70 of the backup mandrel 68 is omitted, as is interior barrier layer(s) 32 and the radial inward extension of outer PE layer or coating 30 across a part of dispensing opening 24 of blank 20.

It will be noted that the spout assembly is of a specific design which is functional for the consumer yet allows for easy manufacturing.

In a specific example of the invention, the power supply was Branson 920 M (2000 WATT). The actuator was Branson 921 AES. The ultrasonic converter was Branson 922 JA. The ultrasonic Booster was Branson Titanium 2:1 RATIO. The machine settings were: Power Supply weld time was 0.35 seconds. The hold time was 0.05 seconds. The dynamic TRIGGER was 50. The actuator air pressure was 90 P.S.I. The down speed was maximum.

Figure 5:
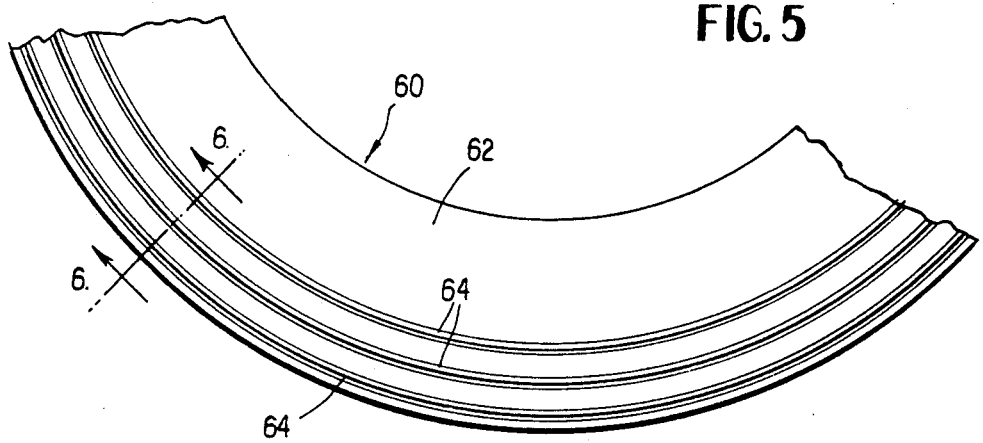
FIG. 5 is a partial plan view of the flat surface of the ultrasonic horn shown at FIG. 4.
Figure 6:
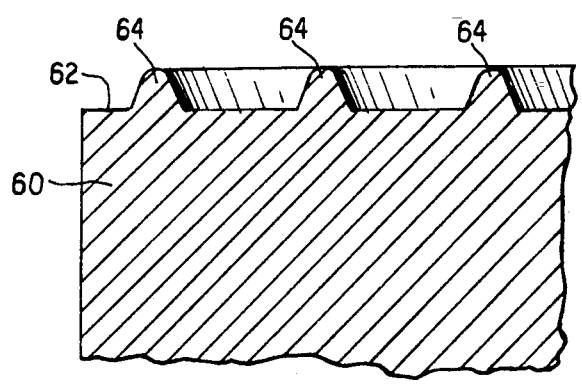
FIG. 6 is a view taken along Section 6—6 of FIG. 5.
Figure 7:
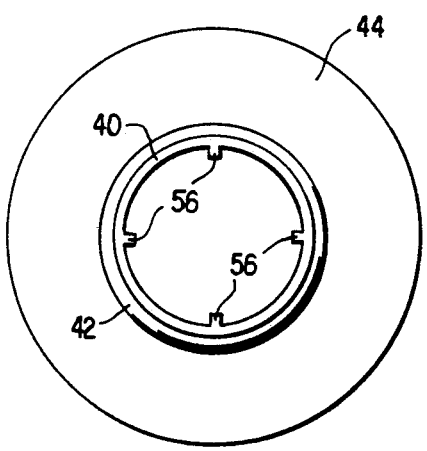
FIG. 7 is a top plan view of the pour spout shown at FIGS. 3 and 4, without a screw cap thereon.

FIGS. 5 and 6 illustrate the specific configuration of the concentric ridges 64 on the flat face 62 of the horn 60. FIG. 7 is a top view of the pour spout, showing flange 44, annular wall 40 and threads 42 on the exterior of the spout. Integral ridges 56 are located on the interior of the pour spout. These ridges play no role in the invention, being conventional in the molding art as a means of ejecting the molded flanges from a mold machine.

We claim:

1. A pour spout and container construction adapted for packaging of liquids or powders, including a closed paperboard container having an exterior surface and an interior surface, one portion of said container having an opening therethrough to thereby define a dispensing opening, an annular pour spout having an integral flange, said flange rigidly mounted exteriorly on said container, said pour spout having a spout passageway at least partially aligned with said dispensing opening, the pour spout formed from LDPE or LLDPE, the carton exterior, at least in the area of said pour spout flange, having a barrier layer of LDPE which is adhered to said spout flange, a plurality of spaced and annularly continuous ultrasonic welds adhering said spout to said carton, said exterior carton barrier layer extending radially inwardly from the edge of said dispensing opening and terminating at an opening termed a pour opening, and wherein a barrier layer is provided on the carton interior radially outwardly of said dispensing opening and extends radially inwardly of said dispensing opening and terminates at said pour opening; said exterior carton barrier layer and said internal barrier layer forming a laminate which is ultrasonically welded together along a continuous annular zone, whereby the raw edge of said dispensing opening is covered by said barrier layers and cannot contaminate the contents of the carton.

2. The construction of claim 1 wherein said ultrasonic welds are concentric and are spaced apart about 0.057 inches.

3. The construction of claims 1 wherein the thickness of said pour spout flange is about 0.02 inches.

4. The combination of claim 1 wherein the diameter of said pour opening is substantially the same as the internal diameter of said spout, and wherein the diameter of said dispensing opening is smaller than the diameter of said ultrasonic welds which join the pour spout flange to the carton exterior.

* * * * *